United States Patent [19]
Farrington

[11] Patent Number: 5,313,382
[45] Date of Patent: May 17, 1994

[54] REDUCED VOLTAGE/ZERO CURRENT TRANSITION BOOST POWER CONVERTER

[75] Inventor: Richard W. Farrington, Mesquite, Tex.

[73] Assignee: AT&T Bell Laboratories, Murray Hill, N.J.

[21] Appl. No.: 63,397

[22] Filed: May 18, 1993

[51] Int. Cl.$^5$ .......................................... H02M 3/335
[52] U.S. Cl. ....................................... 363/16; 323/222
[58] Field of Search ........................... 363/16, 20, 21; 323/222, 259, 344

[56] References Cited

U.S. PATENT DOCUMENTS

| | | | |
|---|---|---|---|
| 4,857,822 | 8/1989 | Tabisz et al. | 363/16 |
| 4,860,184 | 8/1989 | Tabisz et al. | 363/17 |
| 4,931,716 | 6/1990 | Jovanovic et al. | 323/285 |
| 4,959,764 | 9/1990 | Bassett | 323/222 |

OTHER PUBLICATIONS

G. C. Hua, C. S. Leu, Y. M. Jiang, F. C. Lee, "Novel Zero-Voltage-Transition PWM Converters," *The Tenth Annual VPEC Power Electronics Seminar Proceedings*, Sep. 20-22, 1993, pp. 33-39.

Primary Examiner—Steven L. Stephan
Assistant Examiner—Matthew Nguyen
Attorney, Agent, or Firm—Alfred G. Steinmetz

[57] ABSTRACT

A reduced-voltage/zero-current transition (RV/ZC-T) PWM converter includes an added active resonant network shunting the active power switch to reduce the switching losses in both the active power and and passive rectifier switches. The active power switch turns-on under reduced-voltage while the rectifier diode turns-off under zero-current. A soft current turn-off of the rectifier makes this converter suitable for high voltage applications where the reverse recovery losses of the diode can be considerable. An auxiliary switch included in the resonant network also operates with zero-current- switching.

12 Claims, 6 Drawing Sheets

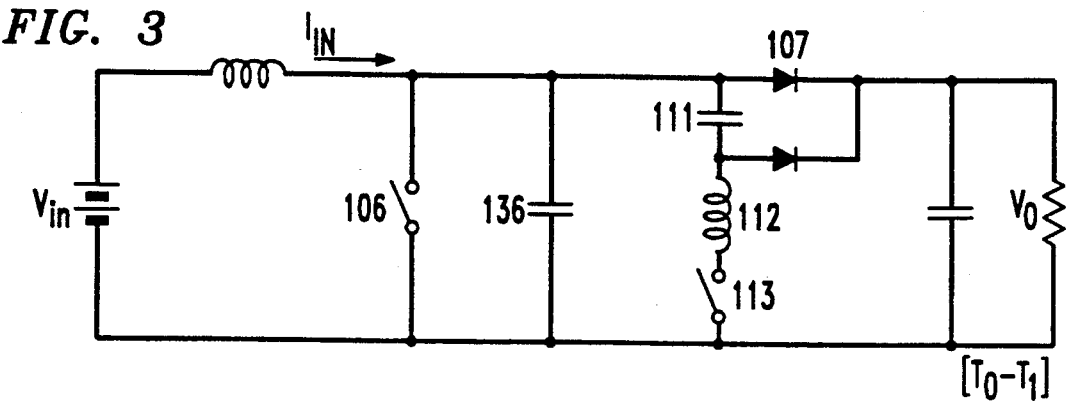
FIG. 3 [T0-T1]
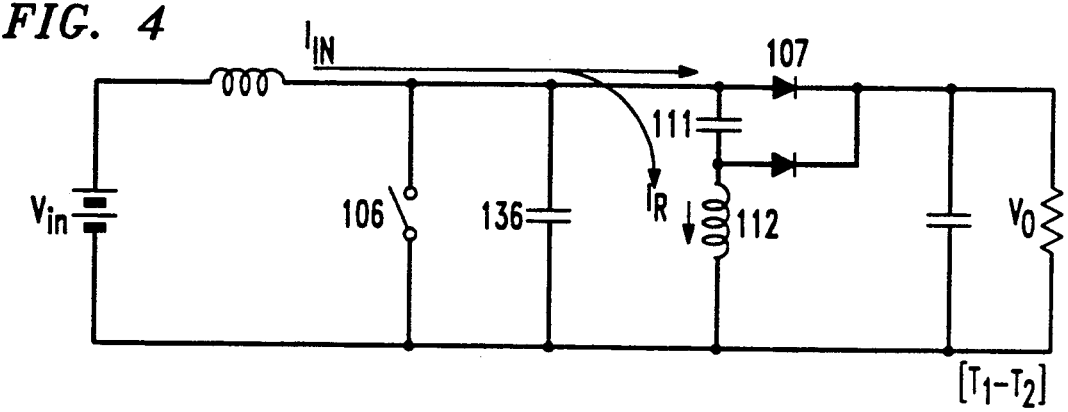
FIG. 4 [T1-T2]
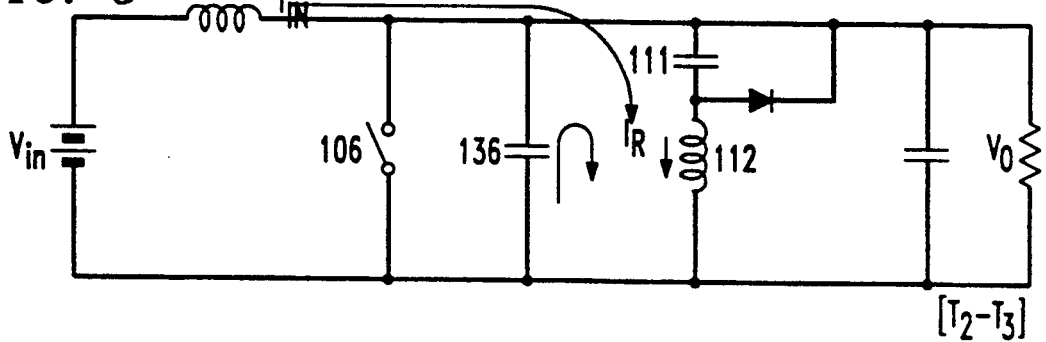
FIG. 5 [T2-T3]
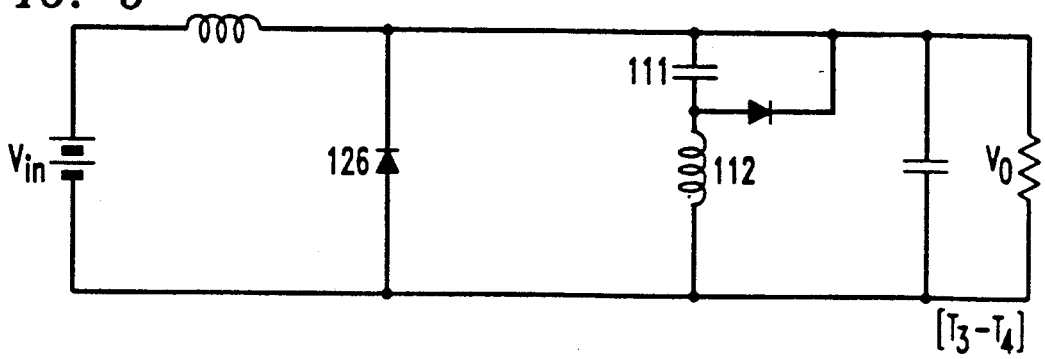
FIG. 6 [T3-T4]

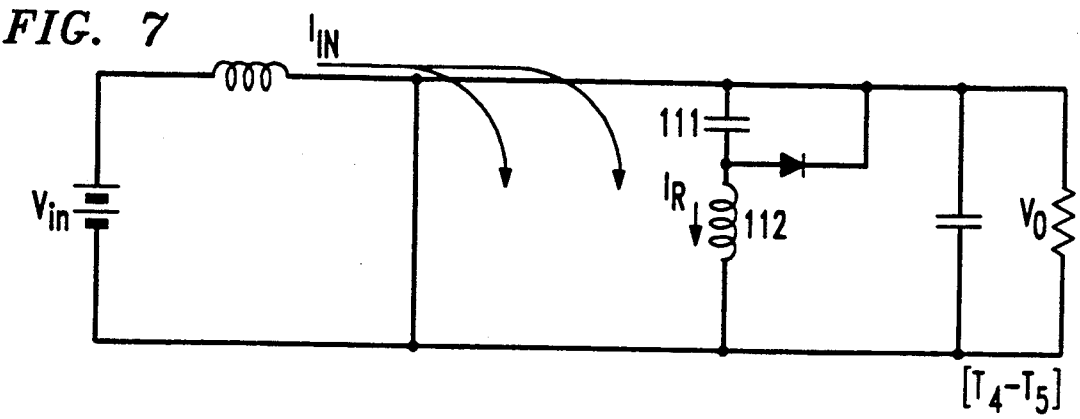
FIG. 7 [T₄-T₅]
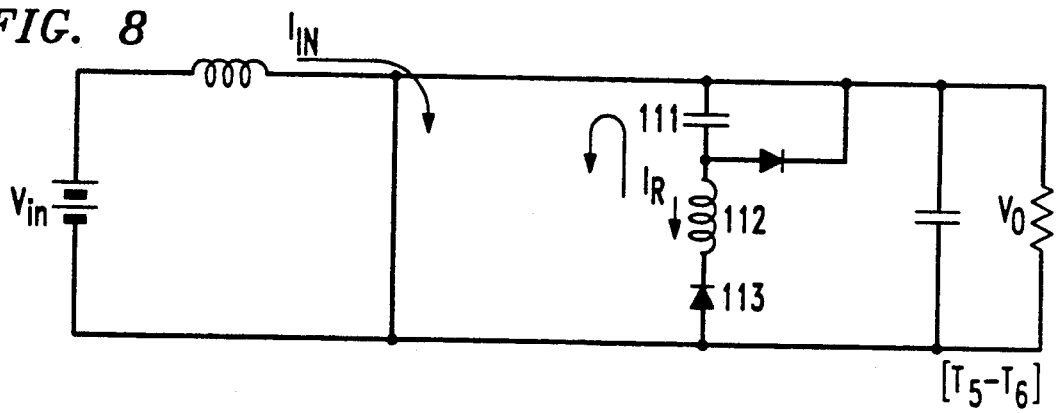
FIG. 8 [T₅-T₆]
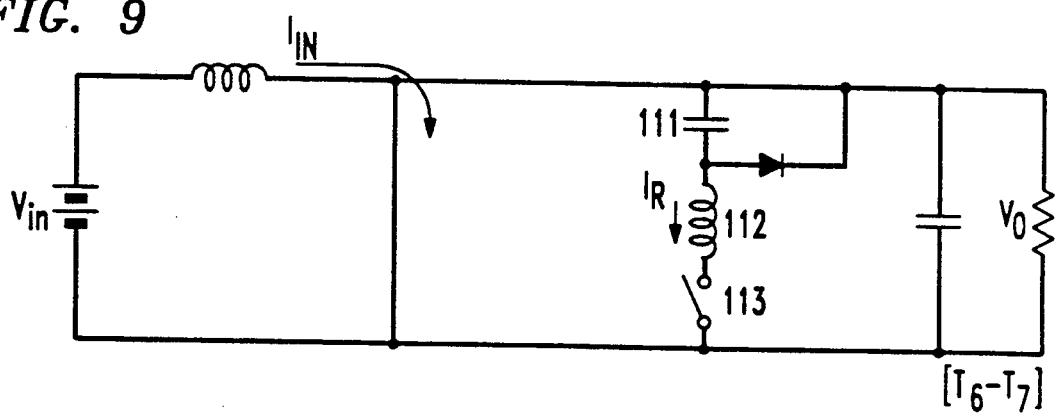
FIG. 9 [T₆-T₇]
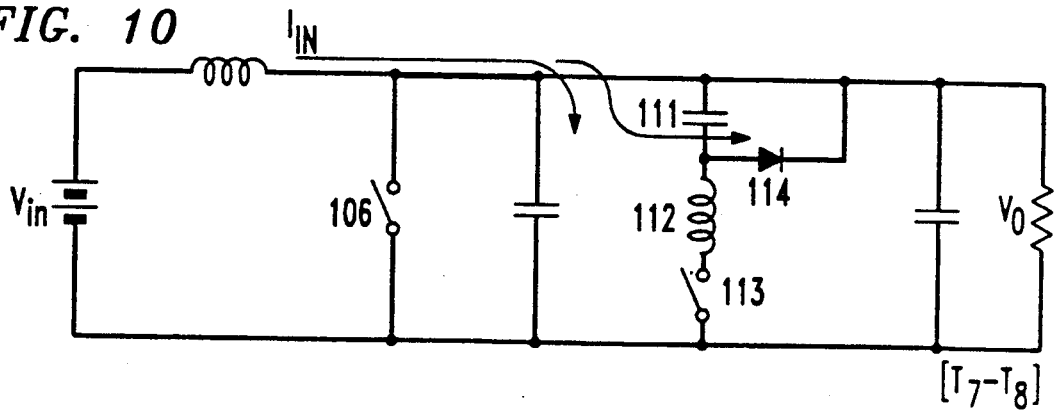
FIG. 10 [T₇-T₈]

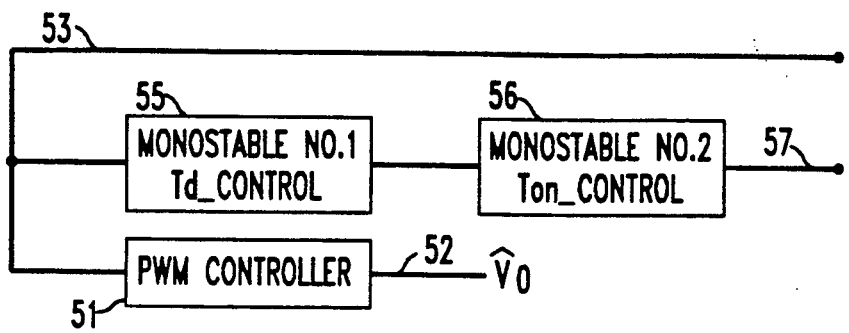
FIG. 11
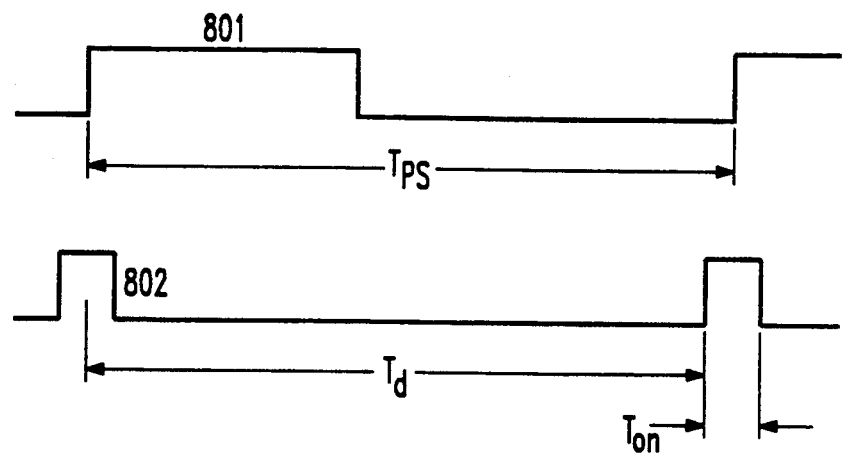
FIG. 12
FIG. 13
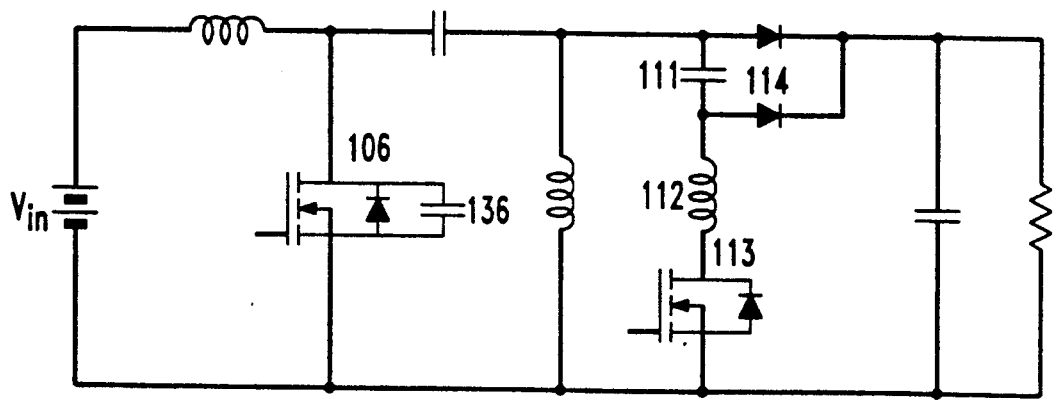

REDUCED VOLTAGE/ZERO CURRENT TRANSITION BOOST POWER CONVERTER

FIELD OF THE INVENTION

This invention relates to DC to DC power converters and in particular to Reduced-Voltage/Zero-Current Transition PWM Converters.

BACKGROUND OF THE INVENTION

Size and weight is a major design variable in the design of any power supply. The size and weight of a conventional pulse- width-modulated (PWM) supply, of a given power rating, may be significantly reduced by increasing its switching frequency. This reduces the size of energy storage components in the circuit since energy storage levels per cycle are reduced at the higher frequency. Without a change in circuit design the increase in switching frequency increases power losses due to the increased number of power switching transitions within a given time interval. Therefore, in order to operate power supplies at high switching frequencies, and gain the full benefit of reduced size and weight, the power switching losses need to be minimized. A number of soft-switching power processing techniques, using "soft" waveforms have been developed to reduce these switching losses. These switching losses are reduced, in some power processing techniques, by circulating energy due to power switch transitions within the power supply as opposed to allowing it to dissipate.

One of the first power processing techniques developed to minimize switching transition losses was the zero-voltage-switched (ZVS) quasi-resonant-converters (QRC). The voltage across the switch is constrained to be zero at the off-to-on transition of the power switch by use of resonant signals. In quasi-resonant-converters resonant signals are quenched within a single cycle of operation. The ZVS-QRC significantly reduces the turn-on switching loss without increasing the current stress through the converter (relative to conventional PWM converters). Unfortunately, in single-ended topologies the voltage stress applied to the principal active power switch is increased considerably and is dependent on the line and load voltage. Furthermore, the junction capacitance of the rectifier diodes causes large parasitic ringing. Parasitic ringing is detrimental to the operation of the converter and this ringing in conjunction with the increased voltage stress of the active switch, limits the number of applications of ZVS-QRCs.

Zero-voltage-switched (ZVS) multi-resonant-converters (MRC), developed subsequently, minimize the effect of this parasitic ringing present in ZVS-QRCs. ZVS-MRCs absorb all of the major parasitic elements in a typical power supply. But soft-switching operation of the semiconductor components in a ZVS-MRC is achieved at the expense of an increased circulation of energy. ZVS-MRCs operate with increased current and voltage stresses as compared to traditional PWM converters, resulting in increased conduction losses that limit application of ZVS-MRCs to high-frequency, low power applications.

A recent family of switching converters utilizes zero voltage/zero- current transition (ZV/ZC-T) in which switching losses are significantly reduced in both active and passive power switches. These switching converters, as well as those converters of the prior art described above, generally have a limited load range because of the requirement of zero voltage switching. It is desirable for switching converters to have a wide range of load accommodation in order to achieve commercial acceptability.

SUMMARY OF THE INVENTION

A reduced-voltage/zero- current transition (RV/ZC-T) PWM converter, embodying the principles of the invention, includes an added active resonant network shunting the active power switch and connected to minimize the switching losses in both the active power and passive rectifier switches. The active power switch turns on under a reduced-voltage condition while the rectifier diode turns off under a zero-current condition. The reduced voltage at turn on of the active power switch is typically $\frac{1}{4}$ to $\frac{1}{3}$ the value of the off voltage across the active power switch. A soft current turn-off, with zero current levels, of the rectifier diode limits ringing and makes this converter suitable for high voltage applications especially where the expected reverse recovery losses of the diode can be considerable in a conventional arrangement. An auxiliary active switch is included in the resonant network and also operates with zero-current-switching.

BRIEF DESCRIPTION OF THE DRAWING

In the Drawing:

FIGS. 3 through 10 are piecewise circuit schematics of various stages of operation of the circuit;

FIG. 11 discloses a suitable controller circuit for application to the converter circuit of FIG. 1;

FIG. 12 shows waveforms of the drive signals generated by the feedback control of FIG. 11; and FIGS. 13, 14, 15, 16, 17, 18, and 19 disclose schematics of many other various type converters embodying the principles of the invention.

DETAILED DESCRIPTION

Figure 1:
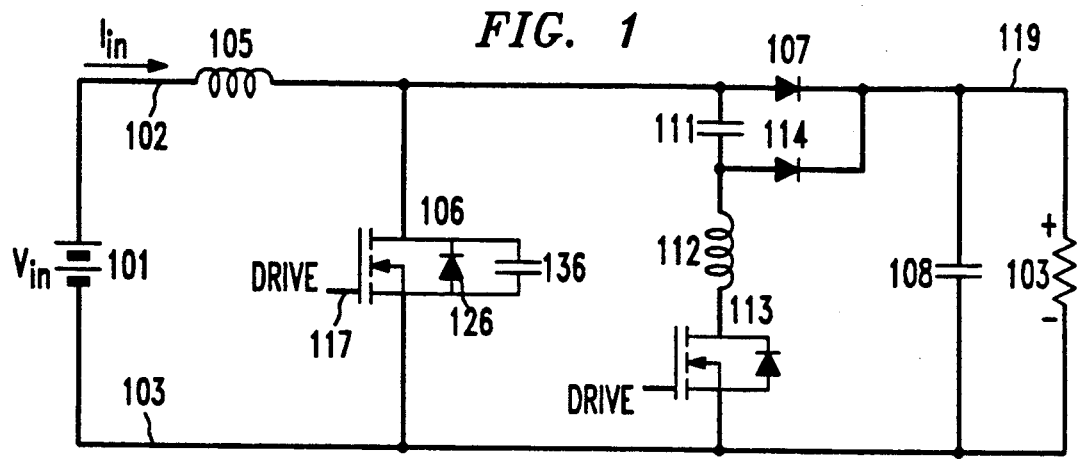
FIG. 1 is a schematic of a boost type switching mode power converter embodying the principles of the invention.
Figure 2:
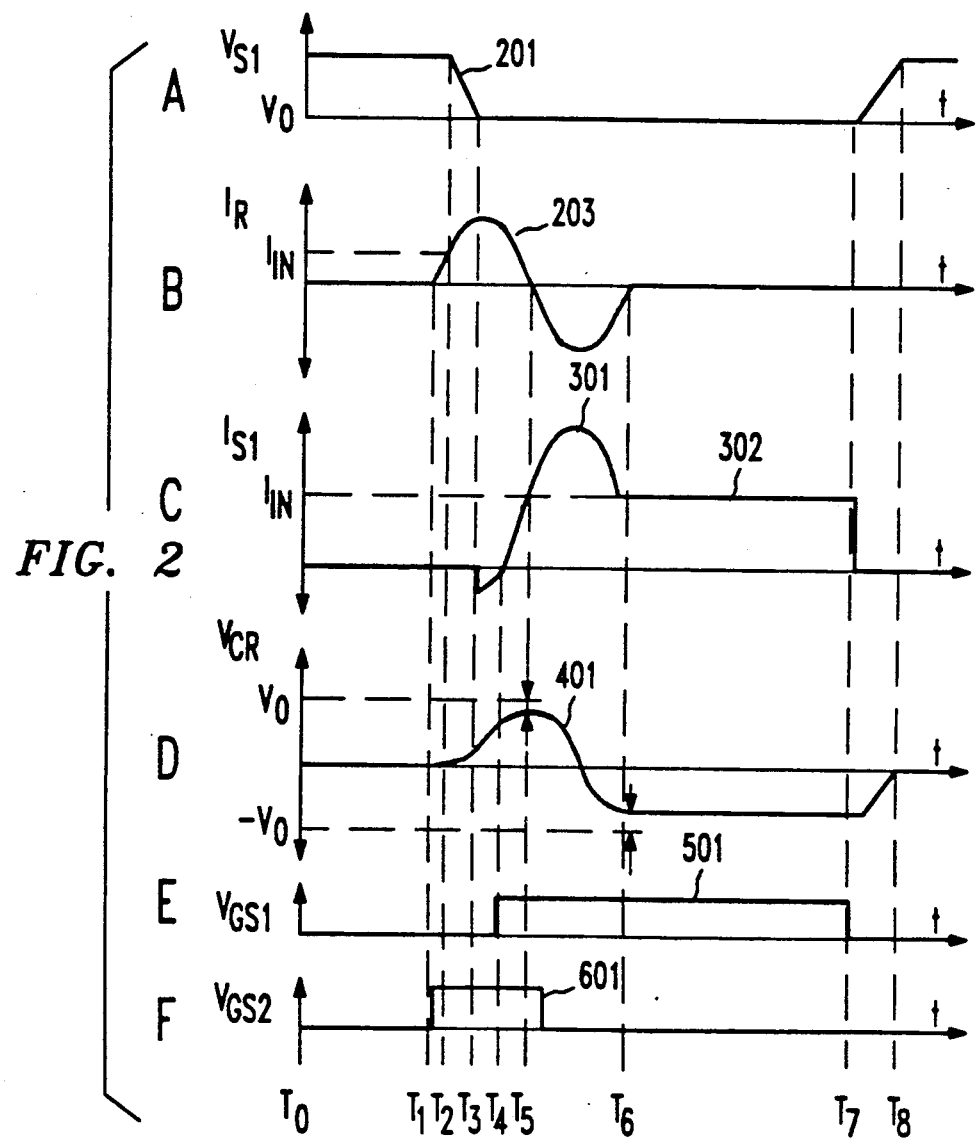
FIGS. 2 discloses graphs of waveforms of signals occurring in the circuit of FIG. 1.

FIG. 1 shows the power train circuit diagram of a boost type RV/ZC-T PWM converter and FIG. 2 shows the circuit waveforms useful for describing the operation of the converter operating under normal conditions. The waveforms of FIG. 2 are delineated by nine timing marks $T_0$ through $T_8$ and back to $T_0$. These timing marks cover different stages of a single cycle of operation. A DC voltage source 101 is connected to the input lead 102 and return lead 103. Input lead 102 is connected by an energy storage inductor 105 to the active power switch 106 and to a rectifying diode 107. The rectifying diode 107 is connected, via a lead 119, to a load resistance 103 to be energized. A filter capacitor 108 shunts the load resistance 103.

The active power switch 106 illustrated is a MOSFET power device which includes a body diode 126, a diode capacitance 136 and a control electrode 117 for receiving control signals to drive the active power switch 106. Waveform 201 of FIG. 2, part A, is a voltage waveform appearing across the drain source terminals of the MOSFET power switch 106. A current waveform 301 in FIG. 2, part C, shows the current flow through the drain-source terminals. As shown current flow begins at $T_3$ and is initially a $\frac{3}{4}$ sine wave and is subsequently stabilized at DC value 302 until current flow terminates at $T_7$. At $T_3$ this current flow is initially flowing through the body diode 126 as shown by waveform 401 in FIG. 2, part D. At $T_4$ a drive pulse (waveform 501 in FIG. 2, part E) is applied to the gate 117 of the MOSFET power switch 106 and the balance of the current flow is through the drain source terminals until the current flow terminates at $T_7$.

A resonant network is connected in parallel with the principal active power switch 106. This resonant network consists of a resonant capacitor 111 in series with a resonant inductor 112 and an auxiliary switch 113. An auxiliary diode 114 is used to bias the resonant capacitor 111. Capacitor 111 has little or no stored charge at the start of the resonant transition at time $T_0$. Current flow through this resonant network is shown by the current waveform 203 of FIG. 2, part B.

The low capacitor charge of capacitor 111 reflects the reduced voltage turn-on of the active power switch 106. This reduced voltage is typically $\frac{1}{4}$ to $\frac{1}{3}$ the voltage drop across the active power switch when it is fully non-conducting. This reduced voltage allows a much wider range of load accommodation without seriously affecting the overall efficiency of the converter.

At $T_1$ a sinusoidal current flow having a period less than the cycle period of the converter begins to flow. This initiation of current flow is simultaneous with the initiation of conduction in the auxiliary switch 113. The drive pulse for enabling conduction in the switch 113 is shown by the pulse waveform 601 shown in FIG. 2, part F, which has a duration from $T_1$ to beyond $T_5$.

The total resonant capacitance operative with the resonant circuit operation includes the resonant capacitor 111 and the diode capacitance 136 and the junction capacitance of diode 107, and any added external capacitance which may be added to slow down the turn-off of power switch 106. To simplify the analysis, the input filter inductance is considered to be large, and is approximated by a constant-current source. Similarly, the output filter capacitance is considered to be large, and it is approximated by a constant-voltage source. The operation of the circuit is in part shown by the circuit waveforms of FIG. 2. The common timing marks $T_0$ though $T_8$ are related to the various stages of operation shown in the FIGS. 3 through 10. FIGS. 3 through 10 shows piecewise circuit stages or the topological circuit stage of each individual sequenced switched circuit connection. Each topological stage represents the effective switch connected circuit during the different intervals of a switching cycle.

The operation of the RV/ZC-T PWM boost converter is of FIG. 1 is best understood by the following sequence of stages described below.

The initial operational stage is stage 1 shown by the circuit topology of FIG. 3. During this stage 1 both active switches 106 and 113 (shown symbolically as switches) are off (open) and non-conducting. The input voltage $V_{in}$ supplies a voltage producing the output voltage $V_0$ through the diode 107. This voltage $V_0$, substantially appears across the power switch 106, and is shown by the voltage waveform 201 in FIG. 2 at $T_1$ No current is flowing through the power switch 106 at this time $T_1$, since it is non conducting, as shown by waveform 301 in FIG. 2. No current flows through the path including the resonant inductor 112 and the resonant capacitor 111 is discharged.

In the subsequent stage 2 shown in the state schematic of FIG. 4 a drive pulse (shown by waveform 601 in FIG. 2) is applied to the gate electrode of the auxiliary switch 113 and it is turned on (conducting or switch closed) at time $T_1$. Current through the resonant inductor 112 increases in a sinusoidal resonant fashion as the resonant capacitor 111 is charged in the positive direction. As the current through the resonant inductor 112 increases, the current flowing through diode 107 decreases at the same rate. By the time $T_2$ the current through the resonant inductor 112 (shown by waveform 203 in FIG. 2) has increased to the level of the current through the filter inductor 115 turning diode 107 off in a soft manner.

In the third stage 3 (see FIG. 5) the diode 107 is non-conducting. Capacitors 111 and 136 form a resonant network with the resonant inductor 112. As the current (shown by waveform 203 in FIG. 2) through the resonant inductor 112 continues to increase, in a sinusoidal waveform, capacitance 136 is discharged in a resonant fashion. Stage 3 ends at time $T_4$ when capacitor 136 has been discharged.

In stage 4 (schematic of FIG. 6) the current through the resonant inductor 112 is greater than the current flowing through the input filter inductor 105 forcing the body diode 126 of switch 106 to conduct, as shown in FIG. 6. Stage 4 ends when the current through the resonant inductor 112 decreases to the value of the input filter inductor current at approximately $T_4$. Switch 106 is turned on during this interval by the drive pulse shown by waveform 601 at $T_4$ to achieve zero-voltage turn-on.

In stage 5 (see schematic of FIG. 7) the current through the resonant inductor 112 decreases after $T_5$ (the negative sinusoidal half cycle) in a resonant manner as capacitor 111 resonates with the input inductor 105. This stage ends just subsequent to $T_5$ when the current through the resonant inductor decreases to zero (see wave form 203 in FIG. 2).

During stage 6 (see FIG. 8) the input filter inductor current flows through switch 106 and the resonant inductor current continues to vary (as a negative half cycle) in a resonant manner. The auxiliary switch 113, approximates a diode, and is turned off during this stage to operate with ZC turn-off (the drive pulse as shown by waveform 601 in FIG. 2 goes to zero). Stage 6 is ended when the resonant inductor current resonates back to zero turning the auxiliary switch 113 off.

In stage 7 (see FIG. 9) the input filter current flows through the principal active switch 106. Both diodes 126 and 114 and the auxiliary switch 113 remain off during this stage. Stage 7 ends at time $T_7$ when switch 113 is turned-off.

In the following end stage 8 (see FIG. 10) capacitors 111 and 136 are effectively connected in parallel. Capacitor 136 is charged and capacitor 111 is discharged at the same rate by the current flowing through the input filter inductor 105. Stage 8 ends when the voltage across capacitor 136 reaches the value of the output voltage. At the same time, capacitor 111 discharges to zero, with the current flow through the diode 114 and a new switching cycle is initiated.

A control feedback circuit for controlling the active switches of FIG. 1 is shown in the FIG. 11. An error voltage $V_0$ representing the deviation of the output voltage $V_o$ of the converter is applied to a PWM controller 51, via lead 52, which is connected to an error voltage generator. Apparatus to generate such an error voltage is well known and need not be shown.

The PWM controller generates a periodic pulse whose duration is responsive to the error voltage on lead 52. The pulse output of the PWM controller shown by the waveform 801 in FIG. 12 is is applied, via lead 53, to drive the main power switch 106. The cycle length $T_{ps}$ of the pulse output determines the cycle length of the power converter.

The output of the PWM controller 51 is also applied to a first monostable circuit 55 whose output is connected in turn to a second monostable circuit 56. The output of the second monostable circuit 56 is applied via lead 57 to drive the auxiliary switch 113.

The output of the PWM controller 51 triggers the monostable 55 at the same time that the power switch 106 is turned on. The output of the monostable is delayed for the time period $T_d$. At the expiration of $T_d$ it triggers the second monostable 56 which produces the pulse output (waveform 802) having the duration $T_{on}$. This pulse drives the auxiliary switch 113 conducting for the duration $T_{on}$.

While a particular controller is disclosed herein it is to be understood that alternate arrangements may be used by those skilled in the art without departing from the spirit and scope of the invention. It is critical that any controller activate the auxiliary switch 113 into conduction prior to activating the power switch 106 into conduction.

Figure 14:
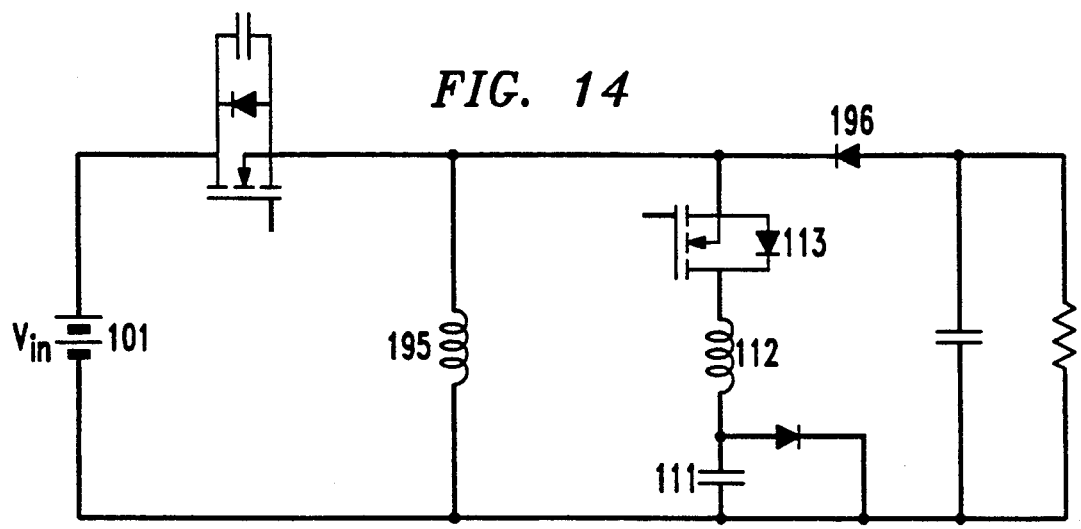

A SEPIC converter incorporating the principles of the invention is shown in the FIG. 13. The SEPIC converter includes the resonant circuit including the capacitor 111, the inductor 112 and the auxiliary switch 113. The resonant circuit shunts the inductor 175 which is part of the sepic circuit topology. An inherent capacitor 136 included in the MOSFET power switch 106 interacts with the series resonant circuit as described above. A buck-boost converter incorporating the invention is shown in the FIG. 14. The boost inductor 195 shunts the resonant circuit comprising the auxiliary switch 113, the inductor 112 and the capacitor 111. In this embodiment the auxiliary switch operates in the function as the switch for enabling conduction in the output rectifier dioded 196.

Figure 15:
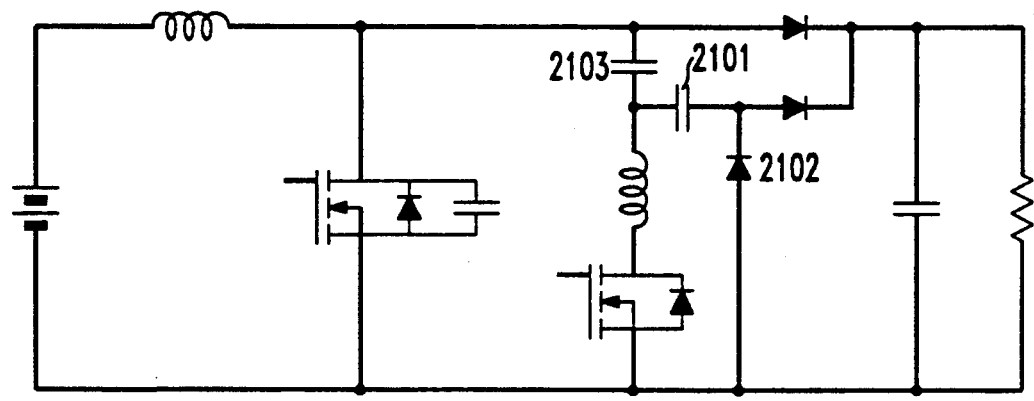

The above described control techniques can be utilized in all converter topologies with input/output isolation. The circuit of FIG. 15 is an implementation of a boost type power converter such as shown in the FIG. 1 schematic. The circuit is similar to that of FIG. 1 but has an added capacitor 2101 and an added diode 2102. These added components cause the current waveform to change slightly in order to reduce component stress further. This arrangement stores a slight negative voltage on the capacitor 2103 which is available at startup to provide energy to actively start the process detailed and explained with respect to FIG. 1.

Figure 16:
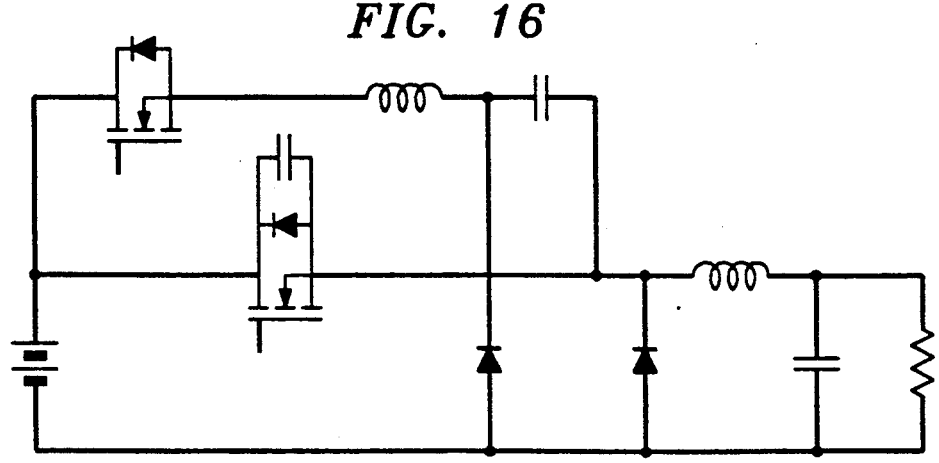
Figure 17:
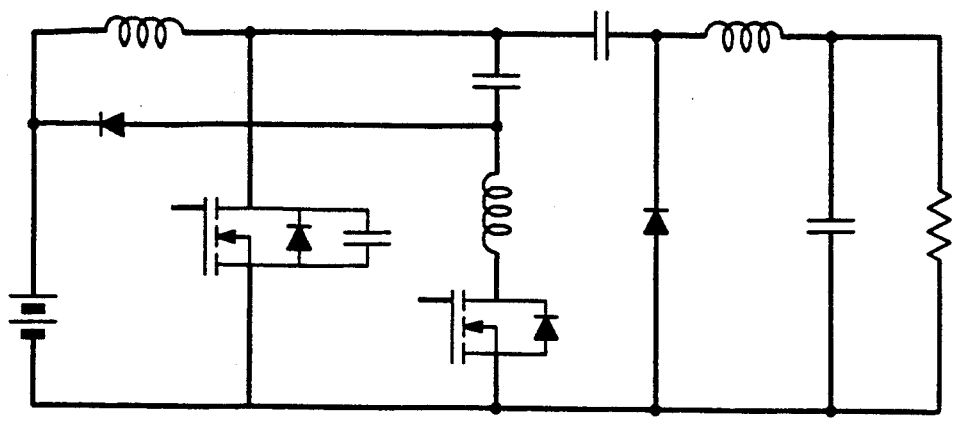
Figure 18:
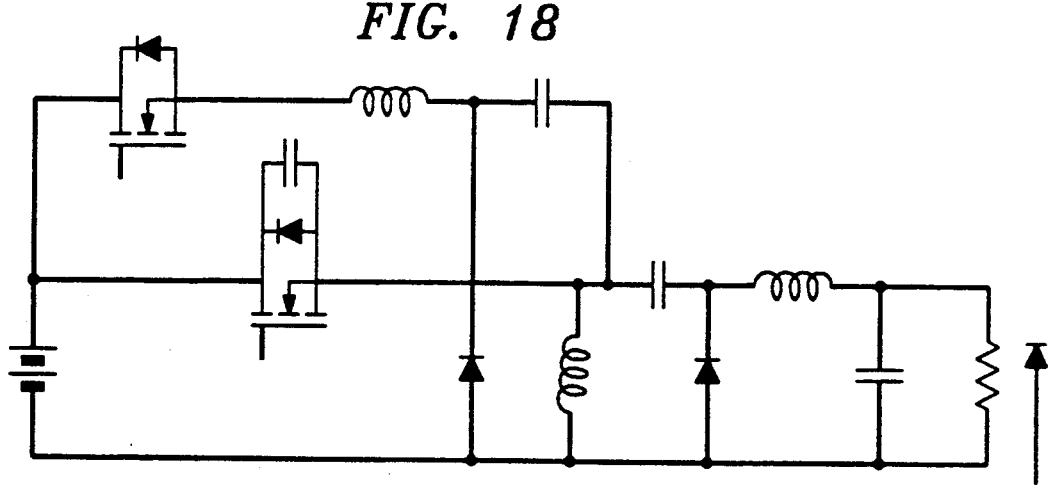

The schematic of FIGS. 16, 17 and 18 disclose converter schematics of buck, cuk and zeta type converters, respectively, which are arranged to operate according to the invention. Operation of these circuits should be readily understandable to those skilled in the art without need of a detailed disclosure.

Figure 19:
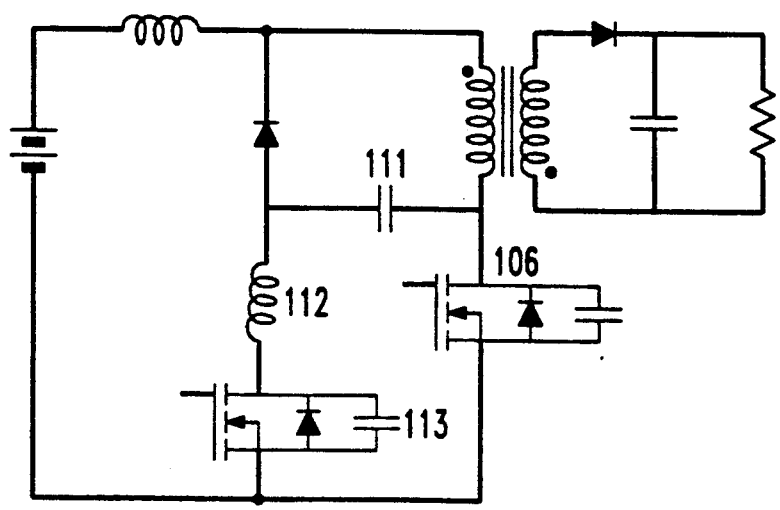

A flyback converter incorporating circuitry for reduced-voltage, zero-current transition is shown in the FIG. 19. The resonant circuit includes the capacitor 111, inductor 112 and the auxiliary switch 113 with the series resonant circuit shunting the power switch 106.

While several embodiments incorporating the invention have been disclosed many variations of those circuits may be devised without departing from the spirit and scope of the invention.

I claim:

1. A reduced-voltage/zero-current transition (RV/ZC-T)PWM converter, comprising:
   an input to accept a voltage;
   an output for coupling voltage to a load;
   power processing circuitry connecting the input to the output and including:
   at least a discrete inductive energy storage element;
   rectifying circuitry including a passive switch rectifying diode;
   an active power switch connecting the storage element to the rectifying circuitry;
   an added active resonant network to minimize the switching losses in both active and passive switches, having a resonant capacitor, a resonant inductor, and an auxiliary active switch connected in series circuit, the series circuit being connected in parallel with the power switch; an auxiliary diode, the resonant capacitor having a first terminal and second terminal with the first terminal connected to the rectifying circuitry and its second terminal connected to the auxiliary diode which is connected in turn to the output; and
   whereby the active switch turns-on under a reduced voltage reduced from the voltage across the switch in its off state, the auxiliary switch turns off at zero current and the rectifier diode turns-off under substantially zero-current.

2. A reduced-voltage/zero-current transition (RV/ZC-T) PWM converter, as claimed in claim 1, comprising:
   a control circuit for controlling switching of the power switch and the auxiliary switch so that the conduction of the auxiliary switch is delayed for a time interval almost equal to a cycle time of the converter.

3. A reduced-voltage/zero-current transition (RV/ZC-T) PWM converter, as claimed in claim 1, comprising:
   a control circuit for controlling switching of the power switch and the auxiliary switch including a controller circuit responsive to an error voltage to generate a periodic pulse for driving the power switch, and
   circuitry responsive to the pulse output for generating a time delay and generating a pulse for driving the auxiliary switch at the end of the time delay.

4. A reduced-voltage/zero-current transition (RV/ZC-T) converter, comprising:
   an input for accepting a DC voltage;
   an output for supplying a voltage to a load to be energized;
   a power switch connected to control current flow between the input the output;
   an active resonant network connected to shunt the power switch and connected to a rectifying diode;
   the active resonant network including a series connected capacitor, inductor and auxiliary switch, the capacitor having first and second terminals;
   an auxiliary diode, the first terminal of the capacitor connected to the rectifying diode and the second terminal connected to the output through the auxiliary diode; and
   a control circuit for periodically driving the power switch with a pulse width modulated pulse and for driving the auxiliary switch with a pulse delayed for almost a complete cycle interval from the start of the pulse width modulated pulse and having a duration extending for a short interval into the duration of a subsequent pulse width modulated pulse.

5. A reduced-voltage/zero-current transition (RV/ZC-T) converter, as claimed in claim 4, comprising:
   a pulse generating circuit responsive to an error voltage to generate a periodic pulse for driving the power switch, and
   circuitry responsive to the pulse output for generating a time delay and generating a pulse for driving the auxiliary switch at the end of the time delay.

6. A reduced-voltage/zero-current transition (RV/ZC-T) converter, as claimed in claim 5, wherein the converter comprises a boost converter.

7. A reduced-voltage/zero-current transition (RV/ZC-T) converter, as claimed in claim 5, wherein the converter comprises a buck-boost converter.

8. A reduced-voltage/zero-current transition (RV/ZC-T) converter, as claimed in claim 5, wherein the converter comprises a flyback converter.

9. A reduced-voltage/zero-current transition (RV/ZC-T) converter, as claimed in claim 5, wherein the converter comprises a SEPIC converter.

10. A reduced-voltage/zero-current transition (RV/ZC-T) converter, as claimed in claim 5, wherein the converter comprises a zeta converter.

11. A reduced-voltage/zero-current transition (RV/ZC-T) converter, as claimed in claim 5, wherein the converter comprises a cuk converter.

12. A reduced-voltage/zero-current transition (RV/ZC-T) converter, as claimed in claim 5, wherein the converter comprises a buck converter.

* * * * *